United States Patent
Bertola et al.

(10) Patent No.: US 12,533,674 B2
(45) Date of Patent: Jan. 27, 2026

(54) SAMPLE TUBE AND RACK TO REDUCE ICE FORMATION ON BARCODE

(71) Applicant: Azenta US, Inc., Burlington, MA (US)

(72) Inventors: Volfango Bertola, Liverpool (GB); David Porter, Warrington (GB); Maisara Abualqumboz, Salford (GB)

(73) Assignee: Azenta US, Inc., Chelmsford, MA (US)

( * ) Notice: Subject to any disclaimer, the term of this patent is extended or adjusted under 35 U.S.C. 154(b) by 800 days.

(21) Appl. No.: 17/661,490

(22) Filed: Apr. 29, 2022

(65) Prior Publication Data

US 2022/0347674 A1 Nov. 3, 2022

Related U.S. Application Data

(60) Provisional application No. 63/201,520, filed on May 3, 2021.

(51) Int. Cl.
*B01L 3/00* (2006.01)
*B01L 9/06* (2006.01)
(Continued)

(52) U.S. Cl.
CPC .............. *B01L 3/5082* (2013.01); *B01L 9/06* (2013.01); *G01N 35/00732* (2013.01); *G01N 35/026* (2013.01); *B01L 2300/021* (2013.01); *B01L 2300/12* (2013.01); *G01N 2035/00346* (2013.01); *G01N 2035/00752* (2013.01)

(58) Field of Classification Search
None
See application file for complete search history.

(56) References Cited

U.S. PATENT DOCUMENTS 4,741,346 A * 5/1988 Wong ................. A61B 10/0051
435/288.1
5,000,331 A * 3/1991 Conlon ................ B65D 23/001
422/561
(Continued)

FOREIGN PATENT DOCUMENTS

CN 206356008 U 7/2017
WO 94/02857 A1 2/1994
(Continued)

OTHER PUBLICATIONS

430921 / Corning 50 mL PP Centrifuge Tubes, Self-Standing, date unknown, 8 Pages.
(Continued)

*Primary Examiner* — Maris R Kessel
*Assistant Examiner* — May Leung Chiu
(74) *Attorney, Agent, or Firm* — Hamilton, Brook, Smith & Reynolds, P.C.

(57) ABSTRACT

The 2D barcode at the base of a sample tube is protected from frosting by an air pocket within a wall of high thermal conductivity material that surrounds the barcode. The wall is of thermal conductivity greater than 14W/m K and preferably greater than 200W/m K. The wall may be formed as a skirt extending from the base of the sample tube or as a part of a supporting rack. The wall, cooled by the sample tube and the frozen sample within the tube, collects frost that would otherwise collect on the 2D barcode and deflects the flow of moist air that would otherwise flow against the barcode.

27 Claims, 9 Drawing Sheets

(51) Int. Cl.
*G01N 35/00* (2006.01)
*G01N 35/02* (2006.01)

(56) References Cited

U.S. PATENT DOCUMENTS

| | | | | |
|---|---|---|---|---|
| 5,711,446 | A * | 1/1998 | Jeffs | A01N 1/10 |
| | | | | 220/23.83 |
| 6,270,728 | B1 * | 8/2001 | Wijnschenk | B01L 9/06 |
| | | | | 422/549 |
| 6,372,293 | B1 * | 4/2002 | Mathus | B01L 3/5453 |
| | | | | 235/494 |
| 7,946,437 | B2 * | 5/2011 | Thilly | B65D 23/001 |
| | | | | 215/249 |
| 8,328,082 | B1 * | 12/2012 | Bochenko | G16H 10/40 |
| | | | | 235/462.15 |
| D827,153 | S * | 8/2018 | Bantug | D24/227 |
| 10,677,810 | B2 | 6/2020 | Grimwood et al. | |
| 10,940,086 | B2 * | 3/2021 | Gitman | A61J 1/16 |
| 2005/0191216 | A1 | 9/2005 | Day | |
| 2011/0181875 | A1 | 7/2011 | Nakahana et al. | |
| 2011/0308335 | A1 | 12/2011 | Pink et al. | |
| 2012/0048827 | A1 * | 3/2012 | Levin | B01L 3/5082 |
| | | | | 215/382 |
| 2012/0051986 | A1 | 3/2012 | Pavlova et al. | |
| 2015/0356398 | A1 | 12/2015 | Morris | |
| 2018/0154359 | A1 | 6/2018 | Ueyama | |
| 2019/0060976 | A1 * | 2/2019 | Krätzig | B21D 51/26 |
| 2019/0152650 | A1 * | 5/2019 | Bantug | A61J 1/16 |
| 2019/0193317 | A1 | 6/2019 | Hovatter et al. | |
| 2020/0107541 | A1 | 4/2020 | Blair et al. | |

FOREIGN PATENT DOCUMENTS

| | | |
|---|---|---|
| WO | 98/05427 A1 | 2/1998 |
| WO | 2022/236237 A1 | 11/2022 |

OTHER PUBLICATIONS

Fisher Scientific, Corning Polypropylene Centrifuge Tubes, date Sep. 1, 2020, 3 pages.
International Search Report and Written Opinion received for PCT Patent Application No. PCT/US2022/072010, mailed on Oct. 7, 2022, 20 pages.

* cited by examiner

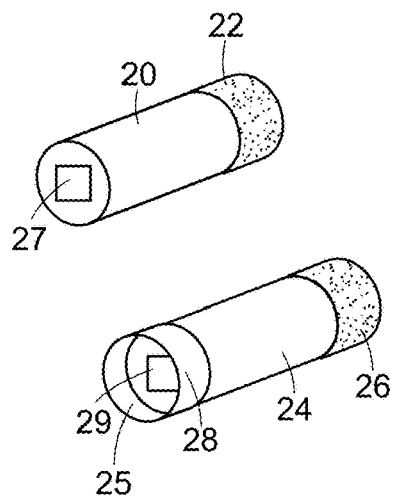
FIG. 3A
PRIOR ART
FIG. 3B
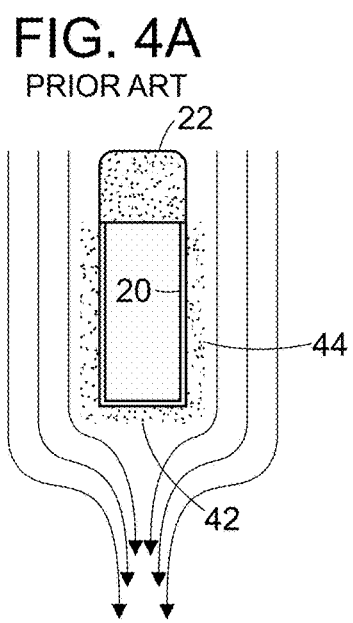
FIG. 4A
PRIOR ART
FIG. 4B
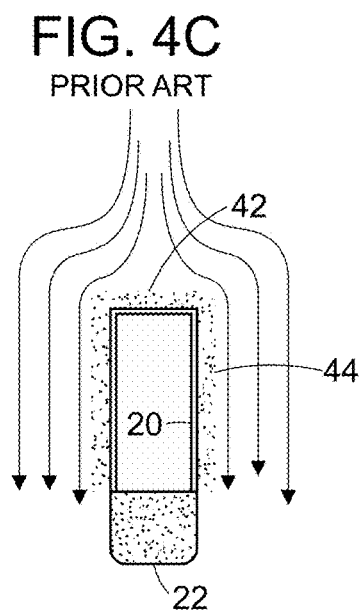
FIG. 4C
PRIOR ART
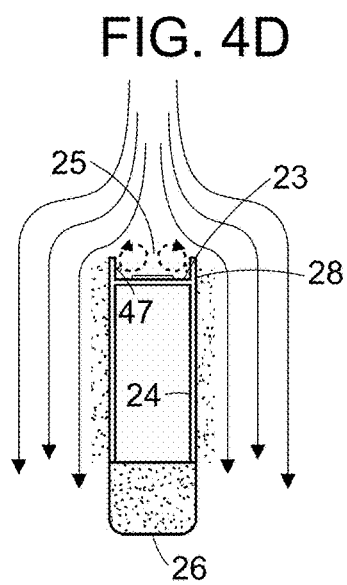
FIG. 4D

Screenshots of a standard sample tube and copper skirted sample tube

SAMPLE TUBE AND RACK TO REDUCE ICE FORMATION ON BARCODE

RELATED APPLICATION

This application claims the benefit of U.S. Provisional Application No. 63/201,520, filed on May 3, 2021. The entire teachings of the above application are incorporated herein by reference.

BACKGROUND

Handling and storage of chemical and biological samples typically employs storage of the samples and reagents in individual sample tubes that are retained in large storage racks for transport and storage efficiency. Sample tubes are typically of diameters in the range of 6 to 26 millimeters (mm). Sample tubes typically are stored in industry-standard racks having an SBS (Society for Biomolecular Screening) format. For example, an 8×12 array of sample tube-holding receptacles with a 9 mm pitch carries 96 sample tubes. Similarly, other standard racks may support 24, 48 or 384 sample tubes. Racks of tubes may be frozen in large automated storage systems held at, for example, −20° C. or −80° C.

Individual tubes may each carry a barcode for identification. The barcodes may be on the sides of the tubes, but to enable reading of an entire rack of tubes with a single image, the barcodes may be at the bottom ends of the tubes. In automated storage systems, robotic systems can pick individual barcoded tubes from racks and reorder the tubes or move the tubes to different racks or other locations. The individual tubes are typically handled by grippers at picking stations.

In the Life Sciences industry, sample tubes are often held at sub-zero temperatures, in some cases down to −80° C. or lower. Sometimes the tubes are moved from one location to another and this transport is managed at sub-zero temperatures to prevent sample damage. As these tubes are removed from the cold transport environment into a laboratory and prepared for loading into an automated store, condensation of moisture from the room onto the tube often occurs. This condensation takes the form of ice crystals that obscure the 2D barcode on the base of the tube, making it difficult for optical scanners to register the sample tube as it is loaded into the secure store.

As can be seen from the photographs of FIGS. 1A and 1B, within a short time with current equipment, the contrast of the barcode printed on the base of a sample tube is substantially reduced and the accuracy (even the possibility) of this code being read by barcode scanners is greatly reduced. FIG. 1A shows barcode at the end of a cold sample tube as it is first exposed to ambient temperature, and FIG. 1B shows that barcode after 90 seconds exposure to ambient temperature.

An improvement in the process is desirable to reduce ice build-up and to allow accurate reading of the 2D barcode.

SUMMARY

A sample tube comprises a sidewall, open at one end and closed with a bottom at the opposite end. An optically readable code, such as a two-dimensional barcode, on the bottom stores data and is readable from below the sample tube. A wall of material of thermal conductivity greater than 14 Watts per meter-Kelvin (W/mK) is about the optically readable code. The wall encloses a volume of air below the optically readable code. The wall freezes moisture from the volume of air, and blocks convective flow across the bottom exterior to reduce icing on the optically readable code when the sample tube is below the freezing temperature of water and exposed to warm air.

In a method of inhibiting icing on optically readable code at the bottom of a sample tube, a wall of material of thermal conductivity greater than 14 W/mK is extended axially from the bottom of the sample tube around the optically readable code. The wall encloses a volume of air below the optically readable code, freezes moisture from the volume of air, and blocks convective flow across the bottom exterior to reduce icing on the optically readable code when the sample tube is below freezing temperature of water and exposed to warm air.

The wall may be a skirt that extends axially from the bottom of the sample tube. The wall may extend at least 2 mm from the bottom of the sample tube, preferably 2-4 mm and preferably at least 3 mm. In general, a skirt length of at least 15% of tube external diameter and preferably at least 25% provides significant reduction in frost, so a range of 15% to 30% is preferred. The wall may be of thermal conductivity of at least 100 W/mK, preferably at least 200 W/mK. With thickness of at least 0.05-0.10 mm, thermal conductance of at least 1,000 W/K-4,000 W/K is obtained. The wall may include a metal.

The method may alternatively be practiced with a rack that may carry conventional sample tubes having optically readable codes facing downward from bottom surfaces. The rack comprises a frame of low thermal conductivity material having ports that receive sample tubes from above the rack. Walls of high conductivity material extend downwardly from the ports at the bottom ends thereof. Walls enclose volumes of air below the optically readable codes. The walls freeze moisture from the volumes of air, and block convective flow across the bottom exteriors of the sample tubes to reduce icing on the optically readable codes when the sample tubes are below freezing temperature of water and exposed to warmer air.

The high thermal conductivity of the walls is preferably at least two orders of magnitude greater than the low thermal conductivity of the main body of the rack. Preferably the high thermal conductivity is greater than 100 W/mK and most preferably higher than 200 W/mK. The walls may extend axially a length of 2-4 mm and may be formed in the rack frame as by over-molding. The walls may include metal.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3A is a perspective view of the conventional sample tube of FIG. 2A.

FIG. 3B is a perspective view of the sample tube of FIG. 2B.

FIG. 4A illustrates the mechanism of frosting on the barcode of a conventional sample tube.

FIG. 4B illustrates the mechanism by which frosting is minimized in the sample tube of FIGS. 2B and 3B.

FIG. 4C illustrates the mechanism of frosting on the barcode of a conventional sample tube inverted.

FIG. 4D illustrates the mechanism by which frosting is minimized in the sample tube of FIGS. 2B and 3B inverted.

DETAILED DESCRIPTION

A description of example embodiments follows.

An analysis of the physical mechanism of ice accumulation on a surface led to an effective approach of reducing ice deposition. The temperature difference between a cold surface and the ambient air induces an airflow (natural convection or circulation), so that moisture-laden air is continuously flowing by the surface, where it deposits its water content as ice. If the convective airflow is stopped or diverted away from the surface, the amount of ice deposited can be significantly reduced.

To that end, the ends of the sample tubes are surrounded with a skirt extending for a few millimeters beyond the surface where the barcode is printed. This enables production of a micro-climate, consisting of a dry air pocket directly adjacent to the base of the tube. The moisture from this microclimate forms ice on the inner wall of the skirt, leaving a small bubble of air adjacent to the base of the tube from which the moisture has been removed and leaving the barcode clear of ice and readable by standard barcode reading equipment.

Figure 1A:
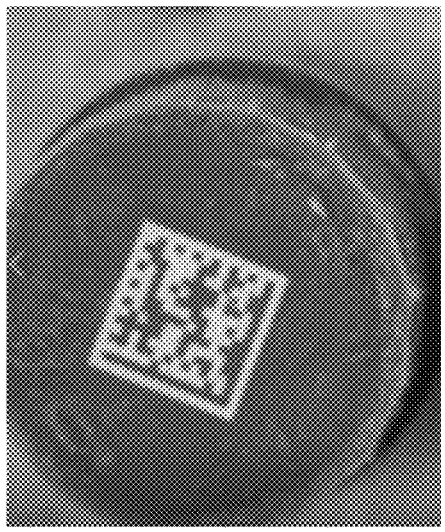
FIG. 1A is a photograph of a 2-D barcode at the base of a conventional sample tube as it is exposed to ambient temperature.
Figure 1B:
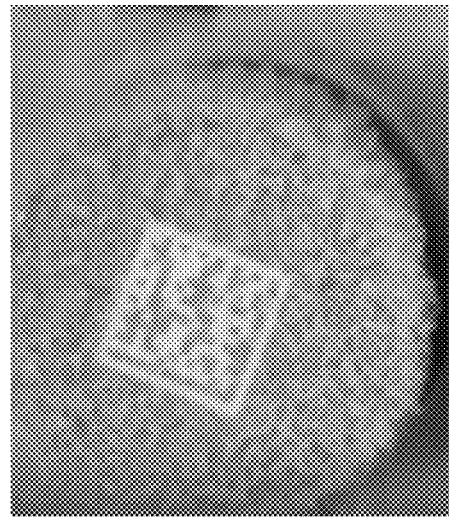
FIG. 1B is a photograph of the cold sample tube of FIG. 1A after 90 seconds of exposure to ambient room temperature.
Figure 2A:
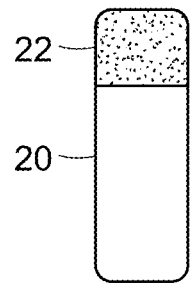
FIG. 2A is a side view of a standard sample tube.
Figure 2B:
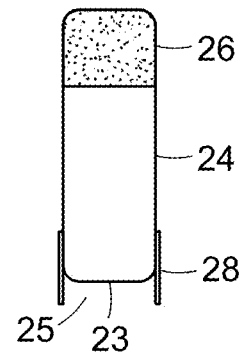
FIG. 2B is a side view of a sample tube having a skirt at the base, shown in cross-section, in accordance with the invention.
Figure 5A:
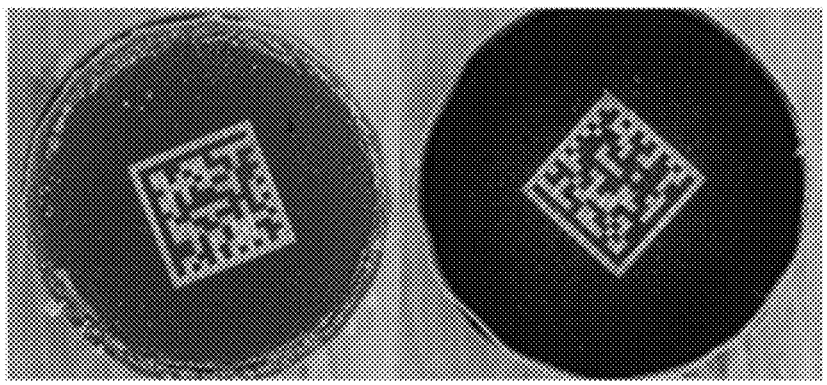
FIGS. 5A-5I are photographs at twenty second increments of a sequence of icing on the barcode of a conventional sample tube to the left and a sample tube embodying the invention to the right.
Figure 5B:
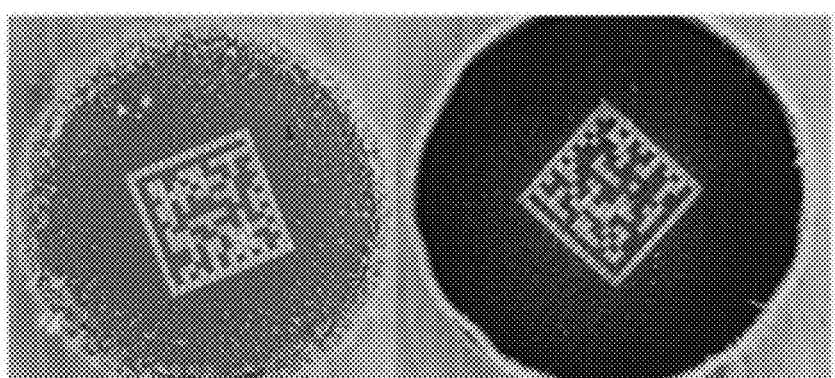
Figure 5C:
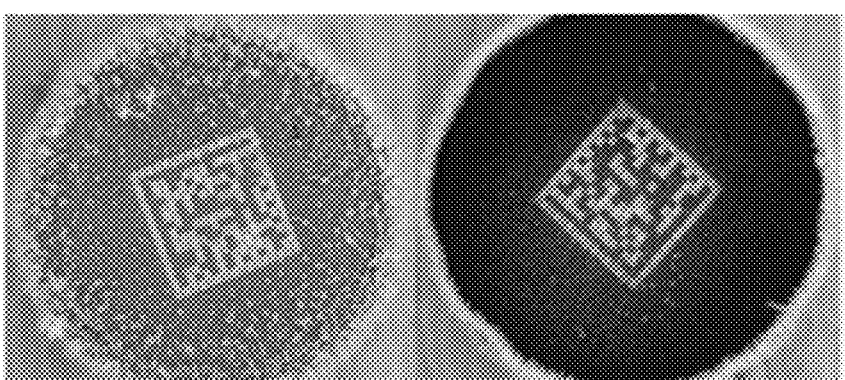
Figure 5D:
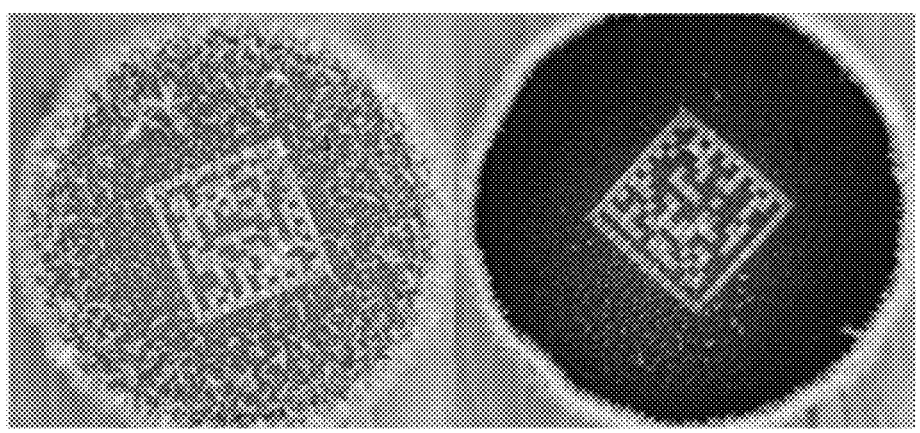
Figure 5E:
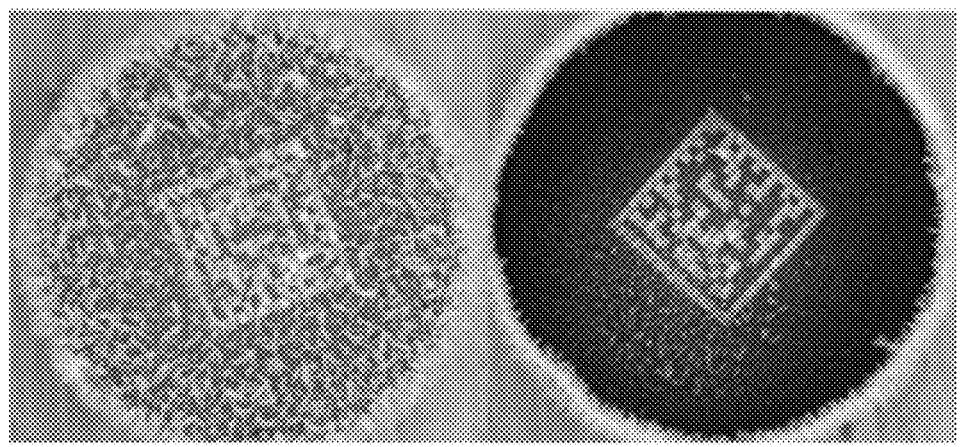
Figure 5F:
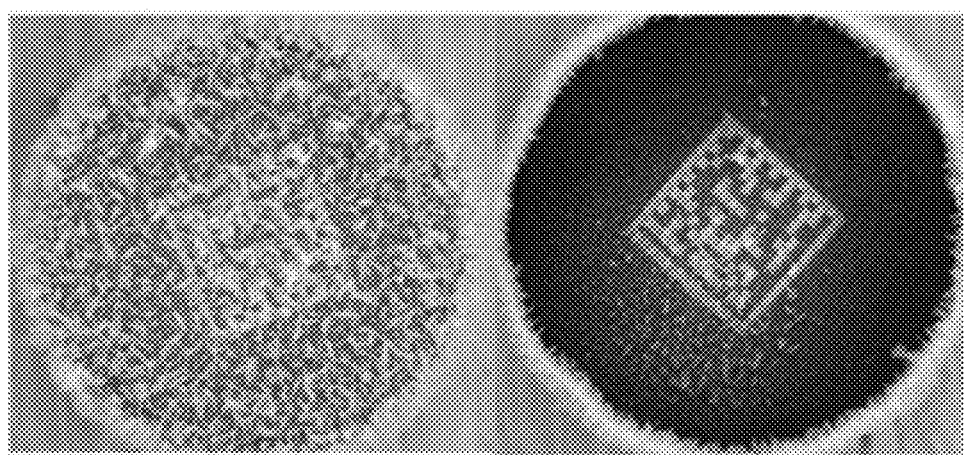
Figure 5G:
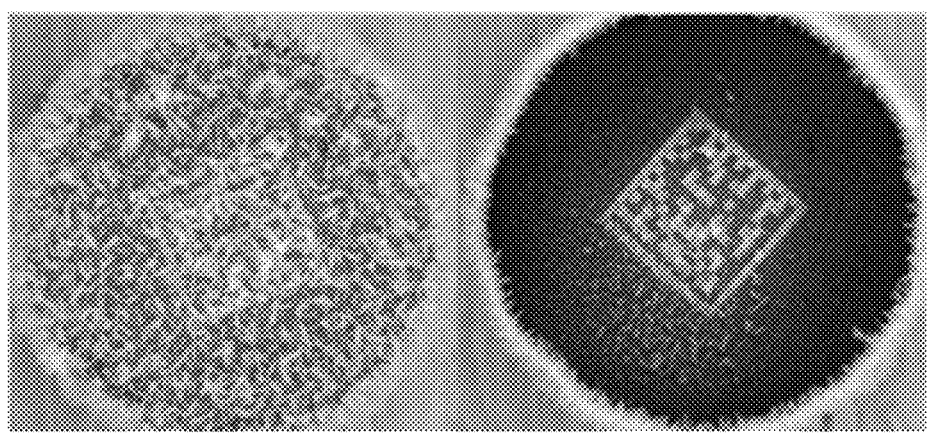
Figure 5H:
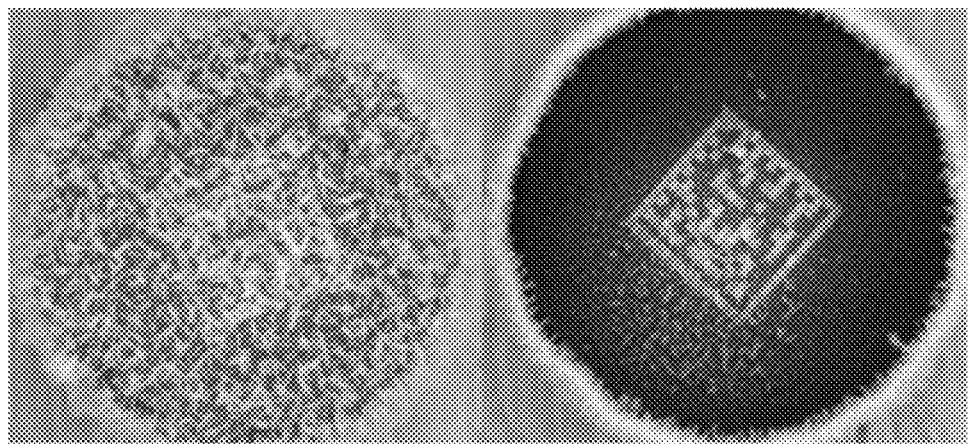
Figure 5I:
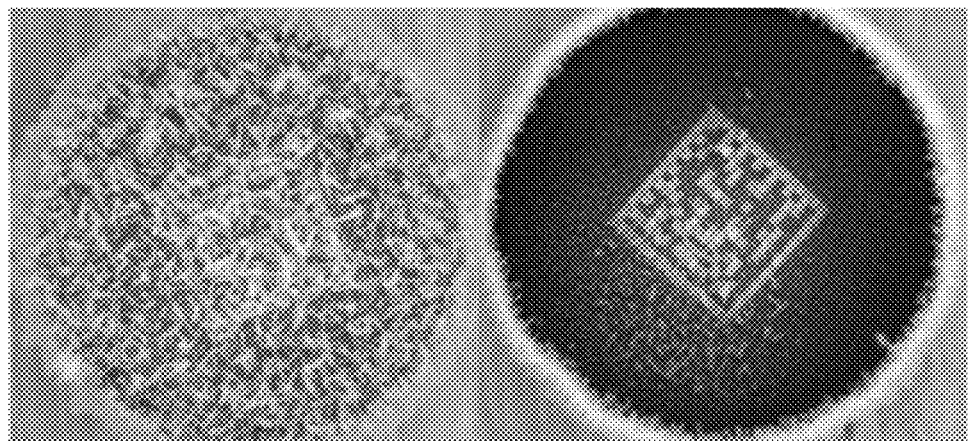

FIG. 2A shows a side view of a conventional sample tube 20 having a cap 22. FIG. 2B illustrates a similar sample tube 24 having a cap 26 but modified with a cylindrical skirt 28 extending beyond the base of the tube. The skirt and the base 23 of the tube form an air pocket 25. FIG. 3A shows a perspective view of the sample tube of FIG. 2A, showing the 2-D barcode at 27. FIG. 3B is a perspective view of the sample tube of FIG. 2B, showing the 2-D barcode at 29.

In general, two mechanisms of preventing icing were identified. The first is that the length of the skirt works as a physical barrier and diverts the wet airflow away from the base of the tube, leaving a pocket of air adjacent to the tube base that has a limited initial amount of moisture. Second, the skirt works as a thermal transfer device, transferring heat from water that collects on the skirt to freeze the water. As the cold skirt collects water from the pocket of air as frost, it dries the micro-climate near the barcode. Sample tubes typically have thin plastic walls, and an extension of those walls as a skirt would have low conductance. But high thermal conductivity skirts are very good as heat sinks, so they perform better than plastic in condensing moisture and provide a drier micro-climate.

FIGS. 4A and 4B compare the freezing of moisture on the sample tube of FIGS. 2A and 3A with that of FIGS. 2B and 3B. With the conventional sample tube of FIG. 4A, moist air flows past the side wall and the base of the tube, and moisture in that air freezes out and collects at 42 on the base of the sample tube and at 44 along the sides of the tube. The 2D barcode is typically positioned at 42 and is thus obscured by the ice. With the modified sample tube of FIG. 4B, moisture in moist air initially in the pocket 25 freezes out onto the base 23 of the sample tube but also collects at 47 on the inner surface of the skirt 28. Air flow 46 around the sample tube is diverted by the skirt 28 and the static pocket of air away from the base 23, with only a small current in the pocket, such that moisture from that air flow is primarily collected on the outer surface of the sleeve 28 and the sample tube 24. Only a portion of the small amount of moisture initially in the pocket 25 collects on the base 23 of the sample tube, thereby leaving the 2D bar code clearer of frost than otherwise.

FIGS. 4C and 4D show the standard and modified sample tubes inverted. Flow is still downward. With the standard tube of FIG. 4C, the moist air first passes by the base and then sides of the tube 20, and frost collects on the base and sides at 42 and 44. With the modified tube of FIG. 4D, flow is diverted by the pocket of air 25 and the skirt 28 to substantially reduce the flow of moist air in the pocket and thus minimize frosting at the base 23. Again, only a small amount of moisture collects on the base 23 where the bar code is positioned.

FIGS. 5A-I are photographs demonstrating the progression of ice formation on the 2-D barcode at the base of the sample tubes. The conventional sample tube is to the left of each figure, and a modified sample tube with a copper skirt is to the right of each figure. The photographs are taken at 20 second increments from 0 seconds in FIG. 5A to 160 seconds in FIG. 5I. There is substantial frosting on the conventional sample tube at 160 seconds and substantially less frosting on the modified sample tube at that time.

Several skirt materials and sizes have been tested with varying degrees of success. The best results have been obtained with conductive skirts protruding approximately 3 mm beyond the base of the tube. It was found that the conductivity of the skirt material and the size of the protrusion beyond the tube base were both important parameters. Skirts made of plastic sheet, paper and aluminum foil were used in the testing in addition to copper and aluminum tape, and best results were obtained with thermal conductivities over 100 W/mK. Success has also been obtained with metals of less thermal conductivity, specifically carbon steel.
Thermal Conductivities:
copper 401 W/m K,
aluminum 235 W/m K,
paper ~0.05 W/m K,
plastic ~0.14 W/m K,
carbon steel 45 W/m K,
stainless steel 15 W/m K.

Figure 6:
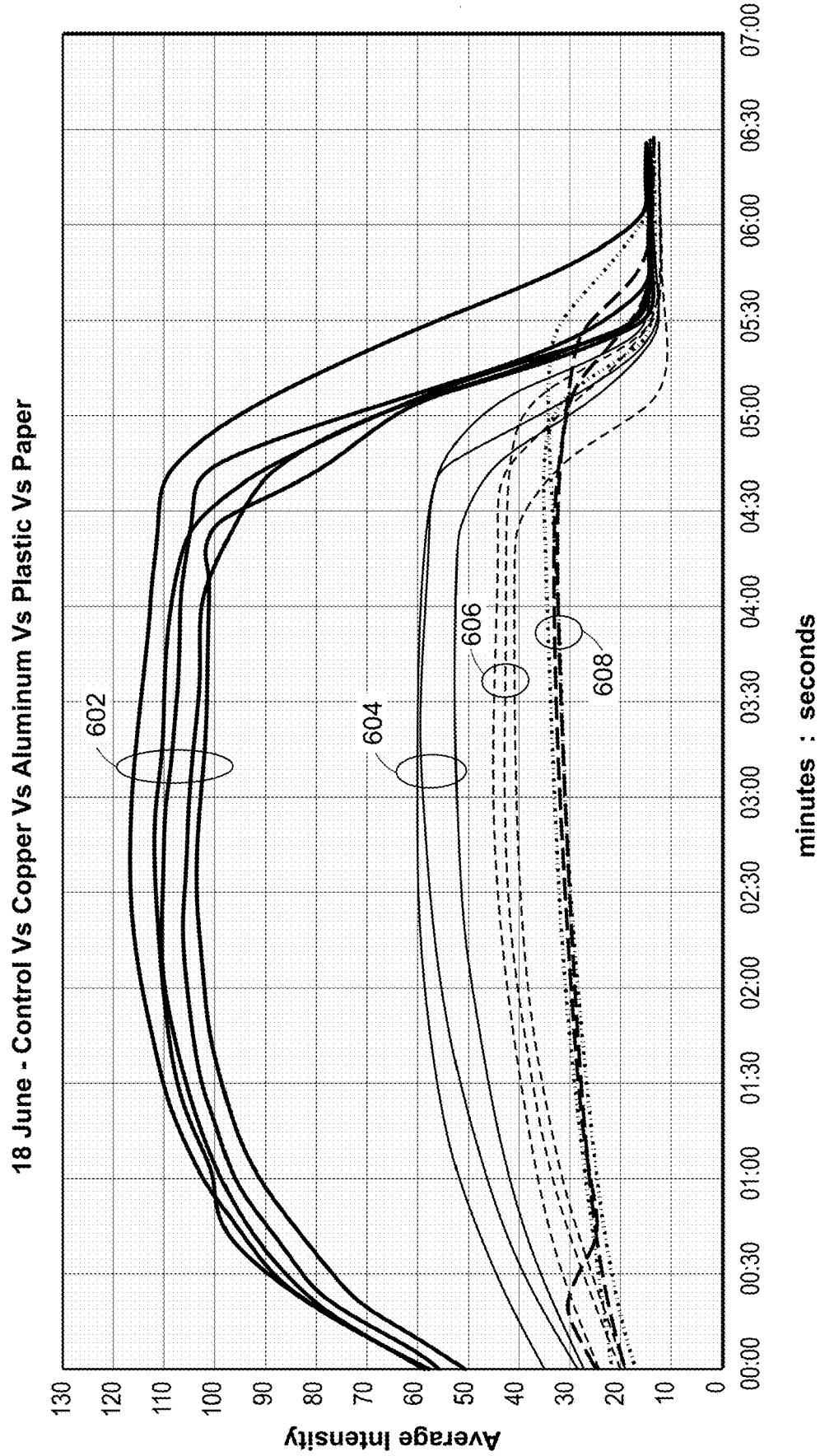
FIG. 6 illustrates experimental results showing the intensity of frosting over time with different skirt materials.

The set of images shown in FIGS. 5A-I were processed using an image processing algorithm to estimate the average ice intensity on the tube base with an output ranging based on color from 0 (black) to 255 (white). The more ice accumulated on the tube base, the higher the average ice intensity number, and vice versa. In FIG. 6, plots 602 represent the average ice intensity on standard tube bases. Plots 604, 606 and 608 show average ice intensity for modified sample tubes having skirts of different materials: paper 604, plastic 606 and copper or aluminum 608. The plots fall off after four minutes because the sample tubes warm and thus release collected frost.

Even a low conductance paper skirt improves performance over a conventional sample tube. A plastic skirt that can be formed in molding of a plastic sample tube also provides improvement. However, the most significant improvement is found with high conductivity copper or aluminum skirts. The high conductivity metals provide a high thermal conductance thermal path from moisture that strikes the skirt to capture the moisture as frost. As a result, the skirt inner surface is kept to a much lower temperature and more efficiently captures moisture that enters the air pocket 25.

The following table depicts the reduction in average ice intensity by different materials skirts.

| Skirt Type | Max. Average Ice Intensity (0 = black "no ice", 255 = White "lots of ice") | Ice Reduction compared to Standard tube (%) | Number of tubes tested |
|---|---|---|---|
| Standard Tube | 116 | — | 20 |
| Copper Tape | 32 | 72% | 10 |
| Aluminum Tape | 31 | 73% | 6 |
| Plastic Tape | 43 | 62% | 6 |
| Paper Tape | 56 | 51% | 6 |

In general, it is preferred that a material of thermal conductivity greater than 100 W/m k, and preferably greater than 200 W/m K, be provided along the length of the skirt. Thermal conductivities greater than 14 W/m K are two orders of magnitude higher than typical plastics and can be acceptable. In the embodiments that follow, the material forming a high conductivity wall forming the air pocket below the tube to capture moisture is generally described as a metal, a material containing metal or a metal coating, but other materials of the required high thermal conductivity may also be used.

With a 12 mm external diameter tube, skirts as small as 1 mm protrusion did have a beneficial effect but maximum frosting reduction on the 2D barcode on the base of the tube was obtained with the 3 mm protrusion. Significant improvement was not found beyond 3 mm. Generally, it is preferred that the skirt length be at least 15% of tube diameter, and preferably at least 25%. Greater than about 25% of tube diameter does not show significant improvement, so 15%-30% is preferred.

The skirt can be introduced into the tube manufacture by a method that results in the tube and skirt becoming non-separable such as over-molding, press fitting, or deposition of metal on a surface (e.g, electroless plating, flame or arc spraying, vacuum metalizing). The skirt could be formed of a composite material with appropriate heat transfer characteristics such as a metal-polymer composite material.

Figure 7A:
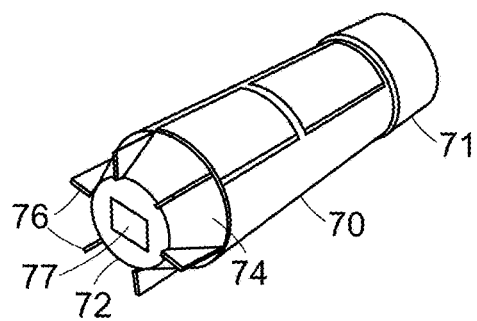
FIG. 7A is a perspective view of a conventional sample tube having an anti-rotate feature.
Figure 7B:
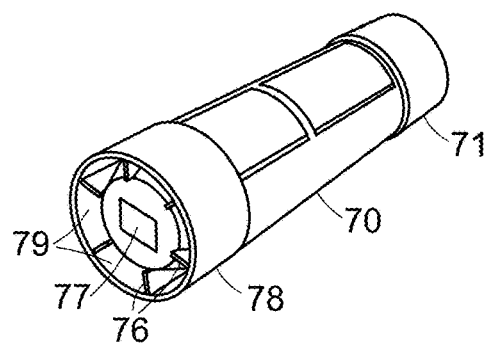
FIG. 7B is a perspective view of a sample tube with an anti-rotate feature modified with a skirt in accordance with the invention.
Figure 8:
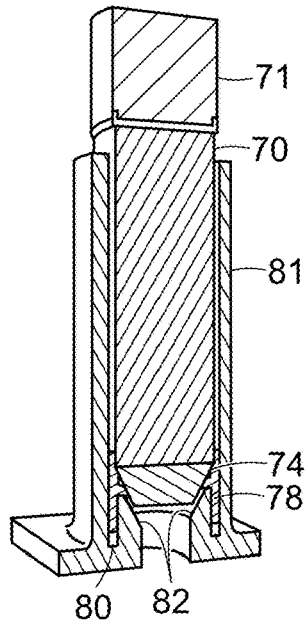
FIG. 8 illustrates the sample tube of FIG. 7B positioned in a holder of a rack.

FIGS. 7 and 8 illustrate an alternative embodiment of the invention in which the sample tube includes an anti-rotate feature. A conventional sample tube 70 with a cap 71 and an anti-rotate feature is illustrated in FIG. 7A. The cylindrical wall 70 of the sample tube transitions to a reduced diameter base 72 on which the 2D barcode is formed through a frustoconical section 74. Vanes 76 extend radially from the frustoconical section 74. When the sample tube is positioned within a rack having complementary vanes, the vanes act to limit rotation of the sample tube when a cap is twisted on or off of the sample tube.

FIG. 7B illustrates a modification of the sample tube of FIG. 7A to include a skirt in accordance with the invention. The skirt 78 extends the full length of the vanes 7b and beyond the base 72 to enclose air pockets 79 between the vanes and below the base 72. Those air pockets serve the function of the single air pocket 25 of FIG. 3B.

FIG. 8 shows the modified sample tube of FIG. 7B positioned in a holder 81 of a rack. Holder 81 has a cylindrical port into which the sample tube is inserted from above. The sleeve 78 extends into an annulus 80 in the holder that surrounds a set of holder vanes 82 that extend vertically. The holder vanes 82 support the frustoconical portion 74 of the sample tube and interact with the vanes 76 of the sample tube to prevent rotation.

Figure 9A:
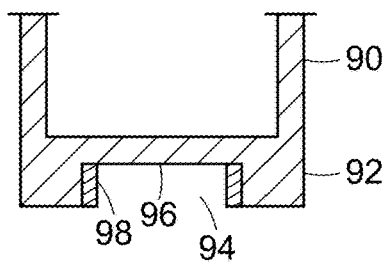
FIG. 9A illustrates an embodiment of the invention in which the barcode is recessed into the base of the sample tube to expose a wall about the barcode, the wall having high thermal conductivity material thereon.

FIG. 9A illustrates another embodiment in which the skirt is molded directly into the base of the sample tube. In this embodiment, the sample tube has a cylindrical sidewall 90 and a thicker base 92 which is recessed at its center to form the air pocket 94. The recess may be circular or it may be rectangular to reduce the volume of the air pocket over the rectangular barcode. To improve conductance along the inner wall of the recess and obtain the benefits of the high conductivity metal skirt described above, the recess is coated with metal or provided with an insert at 98 of copper, aluminum or other high conductivity metal. The coating or insert is of sufficient thickness to obtain a conductance equivalent to the skirts described above. A metal thickness of 0.05 to 0.10 millimeters is best.

Figure 9B:
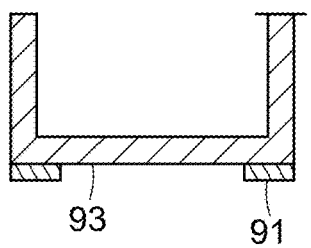
FIG. 9B is another embodiment of the invention in which the wall about the barcode is formed by a disk bonded to the base of the sample tube.

FIG. 9B illustrates an embodiment in which the pocket over the barcode is formed by attaching a metal disk 91 to the base 93 of a sample tube. The disk may be bonded to the base by high thermal conductivity adhesive, for example, or be included in an over-molding so that it becomes inseparable from the tube.

Alternatively, the skirt can be incorporated into a tube rack such that when the tube is in the rack, frost formation on the tube base is much restricted.

Such a rack is illustrated in FIG. 10A, where one of an array of ports is shown receiving a sample tube. The sample tube 100 is of conventional design, having a flat base 101. The 2D barcode is formed on that surface. The rack 102 may be of any construction, but at its lower end it includes a ring 104 of high conductivity material such as metal that extends radially into the port that receives the sample tube. The ring thus forms a lip on which the sample tube 100 rests. This new seating protects the base of the tube and serves as a high conductivity skirt, forming an air pocket 106 of static air below the barcode. The axial thickness of this ring should be equivalent to, or potentially deeper than, the protruding length of a skirt mentioned above. The main body of a sample tube rack is typically of low conductivity plastic (about 0.14 W/mmK) to minimize thermal conduction to the sample tubes, but the metal lip serves the function described above of conducting heat from moisture that contacts the inner wall 108 of the lip, maximizing frosting of moisture in the air pocket 106 on the wall 108 and thus minimizing frosting on the barcode at the base 101. The lip preferably has an axial width 2-4 mm and is of thermal conductivity at least two orders of magnitude greater than that of the main body of the rack, preferably greater than 100 W/mK and most preferably greater than 200 W/mK.

Figure 10:
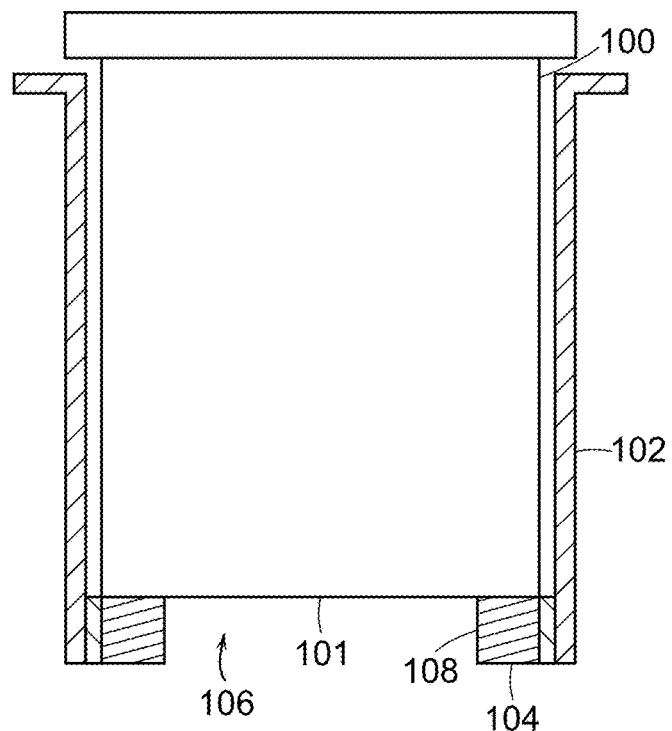
FIG. 10 illustrates a tube-supporting port within an array of ports in a rack modified in accordance with the invention.
Figure 11:
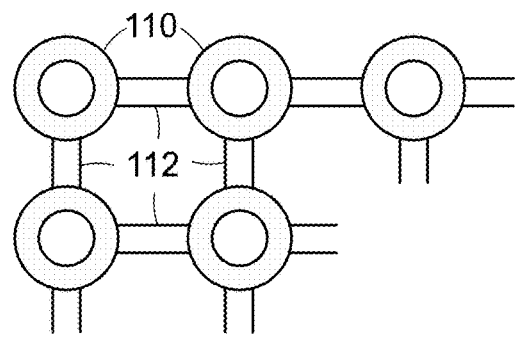
FIG. 11 illustrates a network of rings, each of which forms a lip in a rack as illustrated in FIG. 10.
Figure 12:
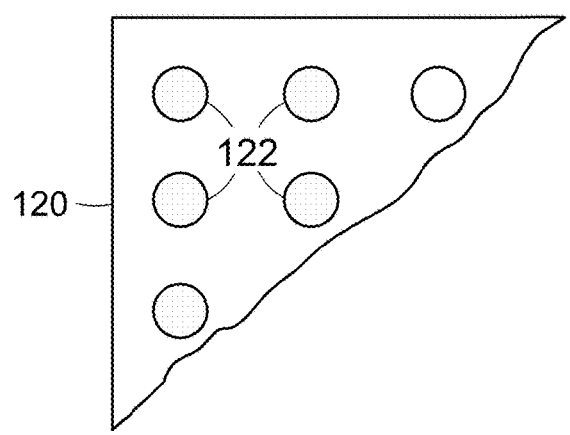
FIG. 12 illustrates a sheet of apertures to be mounted to a rack to form an array of lips to support sample tubes as in FIG. 10.

The rings 104 that form the lips may be individually joined to the plastic rack, as through over-molding, as shown in FIG. 10. Alternatively, the rings may be joined in a network of conductive struts 112 as shown in the plan view of FIG. 11. The rings joined together as a single element and bonded together at the bottom of the rack ease fabrication and may also serve to maintain thermal uniformity throughout the rack. Alternatively, the lips may be formed as apertures 122 in a single sheet 120, each aperture being of smaller diameter than the external diameter of each sample tube to be supported on the sheet 120. The metal sheet 120 may be bonded to the lower surface of the plastic rack.

Figure 13:
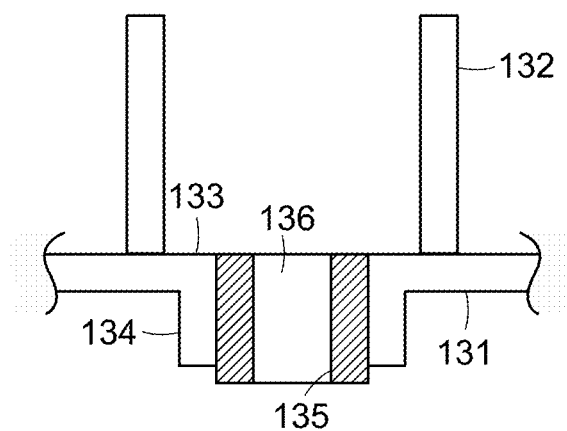
FIG. 13 is a cross sectional view of another rack embodiment.

FIG. 13 illustrates another embodiment of a rack. The rack includes a base 131 of low conductivity material having apertures 136 below ports formed by low conductivity cylinders 132 mounted to the base. Each aperture is sufficiently large to allow viewing of the bar code at the base of a tube in the port but small enough to leave a surface 133 to support the tube. A lip 134 extends below the base and supports low conductivity material such as metal that forms the wall for collecting frost as discussed above.

Figure 14:
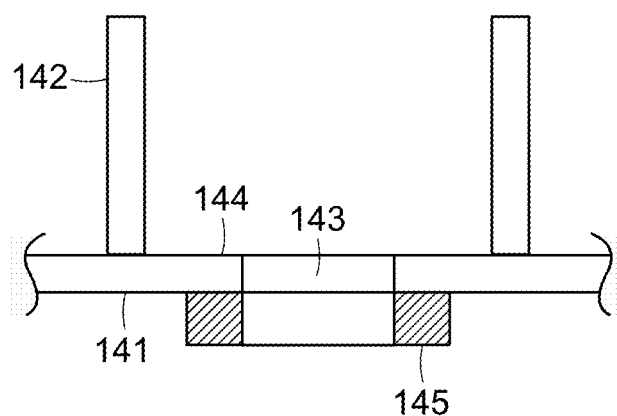
FIG. 14 is a cross sectional view of yet another rack embodiment.

FIG. 14 illustrates another rack embodiment similar to that of FIG. 13 but without the lips 134. As there, ports are formed by low conductivity cylinders 142 on a low conductivity base 141 over apertures 143 that leave support surfaces 144. The high conductivity walls are formed by rings 145 that adhere to or are formed on the bottom surface of the base 141.

In all embodiments, the high conductivity material is limited in the length that it extends along the side of the sample tube to avoid heating of the frozen sample.

While example embodiments have been particularly shown and described, it will be understood by those skilled in the art that various changes in form and details may be made therein without departing from the scope of the embodiments encompassed by the appended claims.

What is claimed is:

1. A sample tube comprising:
   a sidewall open at one end and closed with a bottom at an opposite end;
   an optically readable code on the bottom that is readable from below the sample tube; and
   a skirt that extends axially from and beyond the bottom of the sidewall and about the optically readable code, thereby forming a recessed air pocket and diverting convective flow from across the optically readable code, wherein the skirt:
   has a thermal conductivity greater than 14 W/m K and greater than a thermal conductivity of the sidewall;
   is a) over-molded, b) press fit, or c) deposited on a surface of the sample tube; and
   is non-separable from the sample tube.

2. The sample tube as claimed in claim 1 wherein the skirt extends from the bottom of the sidewall by an amount in a range of 15-30% of an external diameter of the sample tube.

3. The sample tube as claimed in claim 1 wherein the skirt extends at least 2 mm from the bottom of the sidewall.

4. The sample tube as claimed in claim 1 wherein the skirt extends 2-4 mm from the bottom of the sidewall.

5. The sample tube as claimed in claim 1 wherein an inner surface of the skirt has a thermal conductivity of at least 100 W/m K.

6. The sample tube as claimed in claim 1 wherein an inner surface of the skirt has a thermal conductivity of at least 200 W/m K.

7. The sample tube as claimed in claim 1 wherein the skirt includes a metal.

8. The sample tube as claimed in claim 1 wherein the skirt is a metal skirt that extends from the bottom of the sidewall by 15-30% of an external diameter of the sample tube.

9. The sample tube as claimed in claim 1 wherein the skirt is a metal skirt that extends 2-4 mm from the bottom of the sidewall.

10. The sample tube as claimed in claim 1 wherein the optically readable code is a two-dimensional barcode.

11. The sample tube as claimed in claim 1, wherein:
    the sidewall transitions to a reduced diameter bottom through a frustoconical section;
    vanes extend radially from the frustoconical section; and
    the skirt forms air pockets between the vanes and below the bottom of the sidewall.

12. The sample tube as claimed in claim 1, wherein the skirt is molded directly into the bottom, and wherein the skirt is thicker than the sidewall.

13. The sample tube as claimed in claim 1, wherein the skirt is cylindrical.

14. A method of inhibiting icing on an optically readable code on a sample tube, the method comprising:
    removing the sample tube from below the freezing temperature of water; and
    exposing the sample tube to warmer air, wherein the sample tube comprises:
    a sidewall open at one end and closed with a bottom at an opposite end;
    the optically readable code on the bottom that is readable from below the sample tube; and
    a skirt that extends axially from and beyond the bottom of the sidewall and about the optically readable code, thereby forming a recessed air pocket and diverting convective flow from across the optically readable code, wherein the skirt:
    has a thermal conductivity greater than 14 W/m K and greater than a thermal conductivity of the sidewall;
    is a) over-molded, b) press fit, or c) deposited on a surface of the sample tube; and
    is non-separable from the sample tube.

15. The method as claimed in claim 14 wherein the skirt extends from the bottom of the sidewall by an amount in a range of 15-30% of an external diameter of the sample tube.

16. The method as claimed in claim 14 wherein the skirt extends at least 2 mm from the bottom of the sidewall.

17. The method as claimed in claim 14 wherein the skirt extends 2-4 mm from the bottom of the sidewall.

18. The method as claimed in claim 14 wherein an inner surface of the skirt has a thermal conductivity of at least 100 W/m K.

19. The method as claimed in claim 14 wherein an inner surface of the skirt has a thermal conductivity of at least 200 W/m K.

20. The method as claimed in claim 14 wherein the skirt includes a metal.

21. The method as claimed in claim 14 wherein the skirt is a metal skirt that extends from the bottom of the sidewall by 15-30% of an external diameter of the sample tube.

22. The method as claimed in claim 14 wherein the skirt is a metal skirt that extends 2-4 mm from the bottom of the sidewall.

23. The method as claimed in claim 14 wherein the optically readable code is a two-dimensional barcode.

24. The method as claimed in claim 14, wherein:
    the sidewall transitions to a reduced diameter bottom through a frustoconical section;
    vanes extend radially from the frustoconical section; and
    the skirt forms air pockets between the vanes and below the bottom of the sidewall.

25. The method as claimed in claim 24, further comprising positioning the sample tube in a holder of a rack, the holder comprising:
    a cylindrical port that receives the sample tube;
    an annulus that receives the skirt; and
    holder vanes that support the frustoconical section and interact with the vanes that extend radially from the frustoconical section to prevent rotation of the sample tube.

26. The method as claimed in claim 14, wherein the skirt is molded directly into the bottom, and wherein the skirt is thicker than the sidewall.

27. The method as claimed in claim 14, wherein the skirt is cylindrical.

* * * * *